No. 872,435. PATENTED DEC. 3, 1907.
J. W. LEDOUX.
LIQUID METER.
APPLICATION FILED SEPT. 21, 1905.
Fig. 1.
Fig. 2.
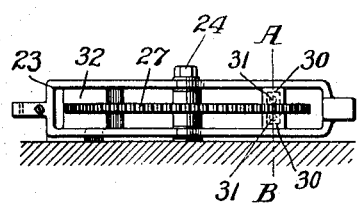
Fig. 3.
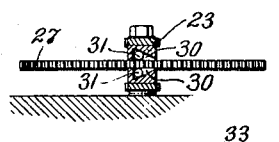
Fig. 5.
Fig. 4.
Fig. 6.
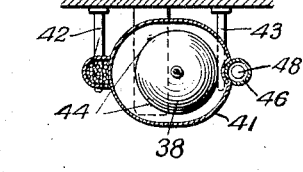
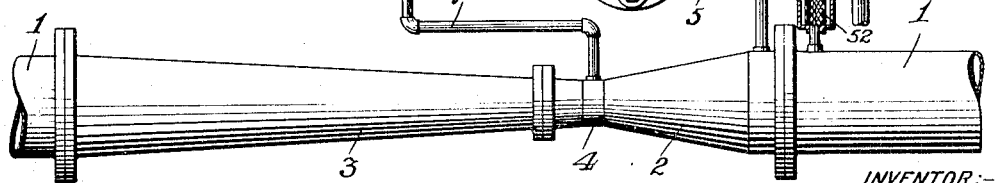
WITNESSES:—
INVENTOR:—
John W. Ledoux
By Charles N. Butler
ATTORNEY.

UNITED STATES PATENT OFFICE.

JOHN W. LEDOUX, OF SWARTHMORE, PENNSYLVANIA, ASSIGNOR TO SIMPLEX VALVE AND METER COMPANY, A CORPORATION OF NEW JERSEY.

LIQUID-METER.

No. 872,435.      Specification of Letters Patent.      Patented Dec. 3, 1907.

Application filed September 21, 1905. Serial No. 279,379.

To all whom it may concern:

Be it known that I, JOHN W. LEDOUX, a citizen of the United States, residing at Swarthmore, in the county of Delaware and State of Pennsylvania, have invented certain Improvements in Liquid-Meters, of which the following is a specification.

This invention is a meter having improved means for determining and registering the flow of a liquid. It comprises a vessel in which a liquid load is accumulated and a siphon which discharges the load when a certain quantity has accumulated, in combination with mechanism for registering the quantity of the liquid passing through the vessel. With metal or glass siphonic tubes of comparatively small bore, say less than three-fourths of an inch in diameter, the loads will discharge when they have accumulated to a definite height though the vessel remain stationary, but generally I prefer to use a vessel tilted under a definite load to induce the siphonic action. In measuring the flow of a liquid, as water, through a conduit, I prefer to use a cam connected with the conduit by mechanism such that the position of the cam is regulated in correspondence with the rate of flow in the conduit. The vessel is charged in a regular manner under a constant head, and discharges upon the accumulation of a definite load. A float is reciprocated in the vessel through a definite space at regular intervals. A tappet connected with the float is so operated that it makes contact with and is withdrawn from the cam at regular intervals so that its arc of vibration varies with the position of the cam and corresponds to the rate of flow through the conduit. And the register is actuated by mechanism operated by the tappet so that the rate of registration corresponds to the distance through which the tappet moves.

In the accompanying drawings, Figure 1 is an elevation partially in section representing my improvements: Fig. 2 is a bottom view of mechanism for actuating the register: Fig. 3 is a sectional view taken on the line A—B of Figs. 1 and 2: Fig. 4 is a sectional view taken on the line C—D of Fig. 1: Fig. 5 is a sectional view taken on the line E—F of Figs. 1 and 4: and Fig. 6 is a plan view of the tilting vessel and float.

In the application of the improvements shown in the drawings, the main conduit 1 through which the liquid to be measured flows is provided with a venturi section comprising the conical parts 2 and 3 converging to the neck or contracted section 4. A pipe 5 connects a normal section of this conduit to the top of a receptacle 6 and a pipe 7 connects the contracted section of the conduit to the top of a receptacle 8, these receptacles having their bottoms connected by a pipe 9. A liquid as mercury heavier than that to be measured is contained in the receptacles 6 and 8. Upon the surfaces of the mercury columns presses the liquid which flows into the receptacles through the pipes 5 and 7, the mercury columns being balanced by their communication through the pipe 9 and the weight or pressure of the liquid thereon.

A pipe 10 and a valve 11 therein provide means for connecting and disconnecting the pipes 5 and 7. Valves 12 and 13 are placed in the pipe 5 and valves 14 and 15 are placed in the pipes 7 on either side of the pipe 10. These valves do not enter into the normal action of the mechanism and are for the purpose of testing and adjusting.

A cam 16 and a sheave 17 fixed thereto are mounted to rotate together on an axis 18. On the sheave is fixed a flexible wire 19. One end of this wire passes through the small bore of the tube 20, set in the top of the receptacle 6, to a connection with the float 21 carried by the mercury in the receptacle, while the other end of the wire is secured to a counterbalancing weight 22. It is to be understood that the bore of the tube 20 is sufficiently small to prevent any material flow of liquid therethrough and a spout 20′ may be connected therewith to discharge any waste that may take place by way of this tube.

A bifurcated lever 23 is mounted to oscillate on the axis 24 and has on the end thereof a tappet 25 adapted to make contact with the periphery of the cam, a counterweight 26 on the lever acting to move the tappet into contact with the cam. Mounted to revolve on the axis 24 between the bifurcations of the lever is a gear wheel 27 for driving a gear wheel 28 to actuate the register 29. The bifurcated members of the lever 23 have therein the races 30 containing the balls 31 which bear against the faces of the wheel 27. These balls clutch and unclutch the wheel and lever at opposite oscillations of the latter, through the actions of the inclined surfaces of the races which wedge the balls against the wheel in moving in one direction and permit them to run freely in moving in the opposite direction.

A stationary bracket 32 has bifurcations on either side of the wheel 27, the bifurcations having therein races 33 containing balls 34 between which revolves the wheel. The walls of these races being inclined suitably therefor, the balls run freely on the faces of the wheel when the latter is advanced, upon the clutching of the lever 23 thereto, and clutch the wheel when the lever is rocked in the opposite direction.

A depending cord 35 is fixed to the tappet end of the lever 23 and is adapted to play through the top of a link 36, the cord having thereon a ball 37 by which the link becomes engaged to the cord in falling and rises independently thereof. A float 38 is connected to the link 36 by a rod 39 which is adapted to reciprocate in and is limited in its reciprocations by the guides 40.

To reciprocate the float in a constant manner and to draw down the tappet end of the lever at regular intervals through its connection therewith, the vessel 41 is mounted to oscillate between the stops 42 and 43 on the eccentrically placed bearings 44. This vessel has its main compartment 45 in communication with a closed auxiliary compartment 46 by a passage 47 which is below the tops of the two compartments. In the compartment 46 is fixed a tube 48 through which the liquid rising to a level near the top of the compartments overflows into the spill basin 49. The vessel is provided with a compartment 50 which may be loaded with shot or other material so as to properly counterbalance the apparatus and the load it is designed to carry without tilting.

The chamber 45 has a liquid flowing thereinto at a constant rate from a basin 53 through a pipe 54 having a contracted outlet 55. The liquid in the basin is kept at a constant level to provide a constant head for supplying liquid to the vessel, the basin having the spill way 58 and the channel 56 by which the overflow reaches a pipe 57 discharging into the spill basin 49. The basin 53 is kept full by liquid flowing from the conduit 1 through the pipe 59 having the screen or filter 52 and the valve 60 therein, the screen being between the conduit and the valve to protect the latter from particles large enough to clog it when the valve is throttled to the required opening. The basin also receives any liquid escaping through the tube 20'.

As in a conduit having a venturi section the pressure from the flow is less at the contracted section than at the normal section and the difference between the two pressures increases with the velocity of flow, the columns of mercury in the reservoirs will vary in height therewith. The mechanism is so adjusted that when the velocity of flow in the conduit is zero the mercury column in the receptacle 6 has an elevation which causes the float 21 and the counterbalance 22 to hold the cam in such a position that the tappet will make contact with the part thereof farthest from its axis and the register is not operated. As the flow increases the column will fall and the cam will revolve therewith so that peripheral points thereof nearer the axis are gradually brought under the tappet which consequently rises higher to make contact therewith. Since the float 38 reciprocates through a constant space at regular intervals by reason of the constant filling and emptying of the vessel containing it and the guides 40 which limit its movements, the tappet will be lowered to a definite point and rise until it makes contact with the cam at regular intervals, its arc of vibration varying with the position of the cam. Consequently the step by step movement of the gear wheel 27 and the rate of the register operated thereby will vary with the rate of flow so that the flow will be registered.

It will be understood that the siphon tube must be such that it will discharge at a greater rate under its minimum discharging head than the rate of flow into the vessel.

Having described my invention, I claim:—

1. A liquid meter comprising a vessel having a siphon for discharging loads accumulated therein, a float which reciprocates in said vessel as the same is filled and discharged, a tappet, a revoluble cam with which said tappet is adapted to make contact, means whereby said float is connected with and withdraws said tappet from said cam, a conduit, a reservoir connected with said conduit, a float in said reservoir, means whereby said float in said reservoir is variable in position with variations in the flow of a liquid in said conduit, and means whereby the position of said cam is varied with the variation in the position of said float in said reservoir.

2. A liquid meter comprising an oscillating vessel having a siphon for discharging loads accumulated therein, means for discharging a liquid into said vessel at a constant rate, a float reciprocating in said vessel at a regular rate with the rise and fall of the liquid therein, an oscillating tappet connected with said float and moved thereby to a definite position at regular intervals, a register connected with and operated by said tappet, a revoluble cam for varying the arc of oscillation of said tappet, a reservoir having a float therein, and means for connecting said float in said reservoir with said cam, whereby variations in the position of said float causes corresponding variations in the position of said cam.

In testimony whereof I have hereunto set my hand this 20th day of September, A. D. 1905, in the presence of the subscribing witnesses.

JOHN W. LEDOUX.

Witnesses:
UTLEY E. CRANE, Jr.,
LOUIS H. BUEK.